Sept. 5, 1967  J. M. McGREW, JR., ET AL  3,339,670
GAS SUPPORTED CAM FOLLOWER SYSTEM
Filed Aug. 25, 1964
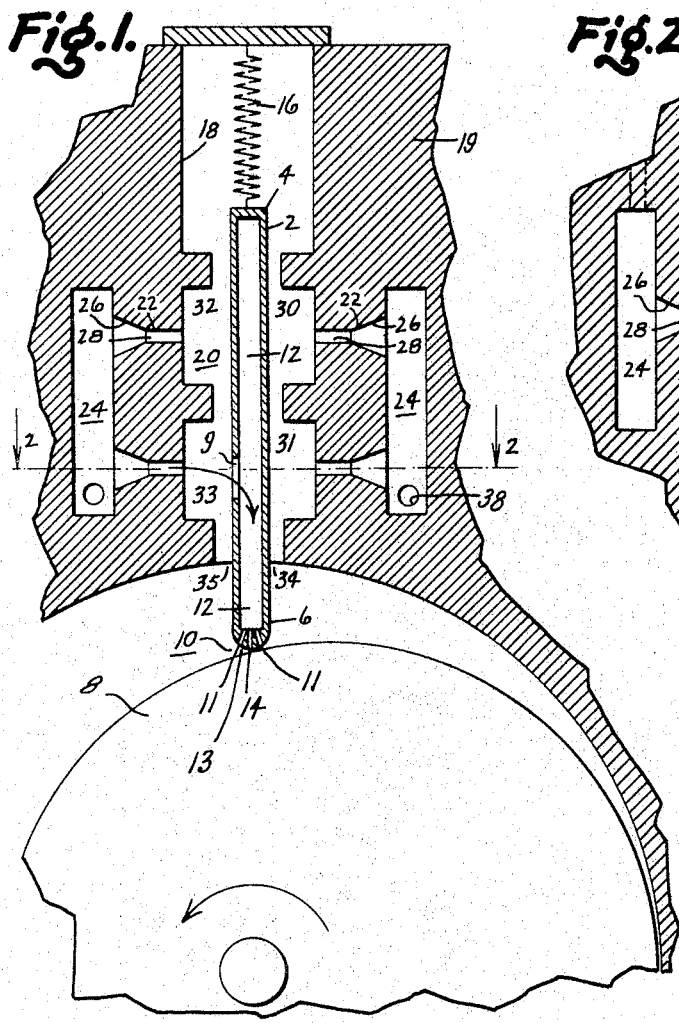
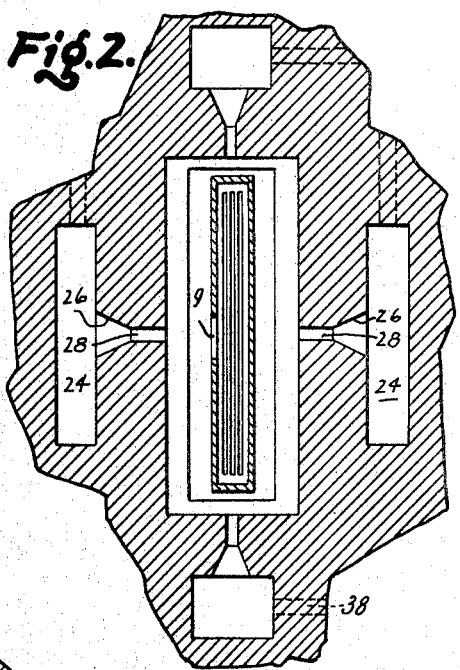
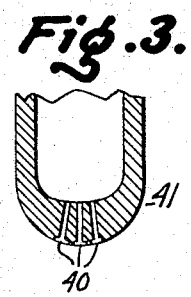
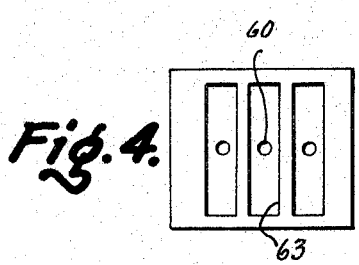
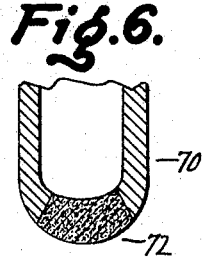
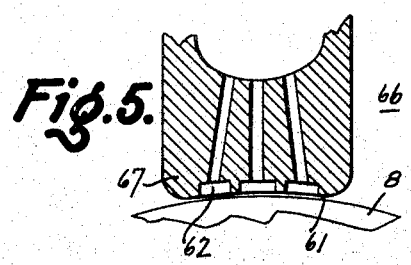
Inventors
John M. McGrew Jr.
Gerald R. Fox
by Paul A. Frank
Their Attorney

United States Patent Office 3,339,670
Patented Sept. 5, 1967

3,339,670
GAS SUPPORTED CAM FOLLOWER SYSTEM
John M. McGrew, Jr., and Gerald R. Fox, Schenectady, N.Y., assignors to General Electric Company, a corporation of New York
Filed Aug. 25, 1964, Ser. No. 391,878
5 Claims. (Cl. 184—6)

Our invention relates to cam followers and, more particularly to a gas supported and lubricated cam follower system.

With the present rapid advance in technology, new applications are creating a trend toward operation of pumps and other machinery in areas where oil or other conventional lubricants are objectionable. In these applications, it is advantageous to have cam followers that operate without the presence of conventional oil based lubricants. In many applications, such as those in the medical arts, maintenance of a sanitary atmosphere is essential to proper operation. Conventional lubricants such as oil contaminate the surrounding atmosphere and defeat the purpose for which this sanitary atmosphere is maintained. The use of mechanical movements that operate efficiently in a sanitary oil free atmosphere are essential to achieving and maintaining these desired conditions.

Another problem that occurs with oil lubricated cam followers is that operation near electrical equipment such as circuit breakers produces a fine mist of oil in the vicinity thereof with the possibility of combustion occurring with resulting serious effects. Other applications exist where high mechanism velocities are employed without external cooling. By the use of a low viscosity gas as a lubricant, the internal shear in the gas film surrounding the follower is correspondingly low and frictional losses and the heat generated are therefore low, thus obviating the need for external cooling.

Our invention envisions a cam follower system whereby the process gas is used to lubricate the cam sleeve bearings along the sides of the cam follower and at the same time lubricate the tip of the follower adjacent the cam.

The chief object of our invention is to provide an improved cam follower lubrication system which employs a low viscosity gas as a lubricant for both the cam follower sleeve and the cam follower tip, itself.

Another object of our invention is to provide a cam follower which is lubricated with a gas that does not contaminate the atmosphere during operation of the follower.

Another object of our invention is to provide a cam follower system in which the pressure of fluid in a follower bearing is the source of supply for the gas lubricating the tip of the cam follower.

Another object of our invention is to provide a rotary compressor having a cam follower therein which is lubricated and supported by a nonoily lubricant.

A still further object of our invention is to provide a cam follower which is lubricated by a noncombustible gas.

These and other objects of our invention will be more readily perceived from our description.

One of the features of our invention is a cam follower in which the gas which lubricates the follower bearing is the source of supply for the gas lubrication to the tip of the cam follower.

The attached drawing illustrates preferred embodiments of our invention in which:

FIGURE 1 is a cross-sectional view of the above apparatus.

FIGURE 2 is a cross-sectional view of an apparatus of FIGURE 1 taken along line 2—2.

FIGURE 3 is an enlarged cross-sectional view of a modification of the tip of the follower of FIGURE 1.

FIGURE 4 is an enlarged view of the tip of the follower of our invention.

FIGURE 5 is an enlarged cross-sectional view of the modification of the follower tip of FIGURE 1.

FIGURE 6 is an enlarged cross-sectional view of a further modification of the follower tip of FIGURE 1.

In FIGURE 1 there is shown a sectional view of the cam and follower system embodying our invention. The construction includes hollow, rectangular member or tube 2 which comprises the cam follower. Tube 2 is sealed at distal end 4, with respect to cam 8, and is perforated at opposite end or rounded tip 6, adjacent cam or rotor 8. These perforations 10 as shown in FIGURE 1 comprise a plurality of slots extending from the interior opening or cavity 12 of tube 2 to the exterior of tip 6 thereof. Three slots as shown in the illustration are illustrative of one mode of our invention and are not to be otherwise construed in a limiting sense. Center slot 14 of slots 10 is vertical whereas the other two slots 11 on each side of center opening 14 are inclined at angles thereto to properly distribute the lubricant. End 4 of follower 2 is secured to the base surface by spring 16 for properly orienting its position. Spring 16 is preloaded to maintain proper relationship between follower tip 6 and cam 8 to retain the fluid film formed between the two and prevent its dissipation.

Surrounding follower 2 and aligned therewith is hollow opening 18 in base member 19 in which follower 2 travels. This opening in main structure 19 is enlarged at various areas 20 along its length, which areas communicate with tubes 22. Through tubes 22 lubricating gas flows into area 18 to provide a gas bearing for cam follower 2. Lubricating gas is pumped into areas 24 from which it flows through tubes 22, including reducing sections 26 to increase the pressure and hold frictional losses low. The gas then flows through smaller diameter tube 28 into area 18.

In operation as cam 8 rotates, this rotary motion is translated into a vertical oscillatory motion of cam follower 2. As cam follower 2 oscillates the point of contact 13 between cam 8 and follower 2 must be lubricated to insure efficient operation of the system. Provision of a gas lubricant between tip 10 and cam 8 insures proper relationship and operation in an oil free atmosphere.

Cam follower 2 is supported by the high pressure gas which flows from areas 24 through tube 22 into area 18. This high pressure gas surrounding cam follower 2 acts as a bearing to effectively support cam follower 2 in its intended vertical position. This same gas besides effectively supporting cam follower 2, also travels into its interior cavity 12 by way of opening 9 along the side of cam follower 2. From there the high pressure gas passes through openings 10 in follower tip 6, which openings are arranged so that at least one of them is always in operative contact with rotor 8, i.e., nearly perpendicular to the tangent of the outer edge of rotor 8 at point 13 of contact between rotor 8 and follower 2. In other words, the gas flowing from the interior of cam follower 2 and impinging against rotor 8 is in a direction to provide the shortest distance of travel of the gas and thereby maintain a high operating pressure, thus bringing one of openings 10 into close proximity with the edge of rotor 8 at all times for the lubrication to be effectively employed between tip 6 of follower 2 and rotor 8 without being dissipated ineffectively to the atmosphere. Dissipation of gas would occur if the opening in the tip could not adjust to changing positions of the rotor edge.

Follower 2 is surrounded in area 18 by a high pressure gas which impinges on it from all sides to support it in a vertical position. The pressure maintained in areas 30 and 31 on one side and 32 and 33 on the other side of follower 2 are equal when the follower is centered in opening 18. When follower 2 is loaded by a force from right to left, in the illustration of FIGURE 1, the pressure in area 30 becomes greater than in area 32 on the other side of follower 2. Correspondingly, opening 34 at the end of slot 18 proximate to cam 8 is decreased because of this shift of follower 2, and slot 35 at the other side of follower 2 is correspondingly increased. Pressure in the areas 30 and 31 therefore becomes greater than pressure in areas 32 and 33 and the follower is thereby effectively supported with a load thereon. It should also be noted that a moment load with the corresponding tilt of the follower is also properly supported in the same manner.

High pressure process gas which surrounds follower 2 travels through opening 9 in the side of follower 2 to fill interior cavity 12 thereof and then projects through openings 10 in end 6 to form a gas film between follower 2 and rotor 8. This thin layer of gas insures friction free operation of the follower with an oil-less lubricant.

FIGURE 2 depicts a cross-sectional view of the apparatus of FIGURE 1 indicating that openings 24 through which high pressure gas is pumped into area 18 surrounding follower 2 exist on all sides of the follower to properly support and lubricate it. Entrance tubes 38 by which gas is pumped into areas 24 are also illustrated in FIGURE 2. It will be appreciated that follower 2 is illustrated as rectangular in cross section, and opening 18 is correspondingly rectangular in cross section. These limitations are illustrative of a particular mode of our invention and are not intended to limit the invention thereto.

Another embodiment of follower 2 is shown in FIGURE 3, in which exit orifices 40 are positioned closer together and are combined with a follower tip with a greater radius of curvature than tip 6 of FIGURE 1 to provide a smaller more concentrated area in which gas lubricant contacts rotor 8. By this construction, tip 41 can support greater loads since more than one of openings 40 are in lubricating contact with rotor 8 at the same time. This then provides a greater lubricating pressure in a small concentrated area.

FIGURE 4 illustrates a bottom view of a modification of the follower of our invention showing openings 60 which communicate with larger slots 63 forming pockets in which the lubricant gas is entrapped to focus its pressure effectively between the follower and the rotor. Pockets 63 then distribute the pressure most effectively by allowing for imperfections in both rotor 8 and follower 2 to be compensated for, since an area of contact is provided instead of mere point contact between the two.

In the modification shown in FIGURE 5, follower tip 67 is concave in cross section, permitting follower 2 to be of the same or very nearly the same curvature as that of cam 8, permitting extremely close contact between follower 66 and cam 8. This results in all three openings 62 of follower 66 operating at the same time thereby providing a more concentrated film of gas between follower 66 and rotor 8. With this configuration the entire follower tip surface 61 is in effective contact with cam 8 thereby employing the entire pressure emitted through openings 62 to provide the lubricating film. By using this method, large loads are carried since all pressure is effectively being used, without any useless dissipation thereof. This structure employs the entire gas pressure within follower 66 and converts it into the lubricating film between follower 66 and rotor 8.

A further modification of the follower tip is illustrated in FIGURE 6 wherein follower 70 has an insert at tip 72 of a porous material, e.g., a metal or ceramic. The multiplicity of holes in the porous material provides for effectively employing the gas pressure within follower tip 70 with the least resistance thereof. Because of the great amount of openings the resistance to the flow of gas from within follower 70 to the outside thereof is very slight. Therefore, the majority of the pressure is effectively used in forming the film between the follower tip and the rotor with very little dissipation due to resistance losses. It will be appreciated that this porous material structure can be employed with either the convex tip as shown in FIGURE 6 or the concave tip as shown in FIGURE 5 or with any other follower tip of our invention, depending on the variations involved in the cam on which the follower rides. Porous insert 72 avoids the necessity of machining a multiplicity of slots and also avoids frictional losses in distributing the pressure through the follower tip to the area of use, thus providing a well distributed film on which the follower rides. Insert 72 of porous material is effectively secured to the remainder of the follower to provide a firm bond for an effective well constructed cam follower.

By employing the aforementioned gas lubricated follower in a rotary compressor, the compressor is effectively employed in areas where an oil lubrication system would be objectionable. It also is employed where an oil lubrication system would break down under continued use. This permits the effective employment of rotary compressors in areas or under conditions which were hertofore impossible. Cam follower 2 acts as a piston to compress the air, which is then distributed as desired.

It will be appreciated that since the gas film supporting the cam follower is of a low viscosity, the internal shear in this film is low and thereby frictional losses are low. The heat generated is correspondingly low because of the low frictional losses, thereby permitting high velocities in operating parts without the need for external cooling. It is further noted that not only are the viscosities low for the gasses but vary slightly with temperature. This means that a gas supported cam follower system operates effectively over an extremely large temperature range from temperatures that are in the cryogenic region to those of several thousand degrees Fahrenheit, without any impairment in the operation of the system. It is noted that the gas employed may be any of the conventionally used lubricating gasses including air.

It is now apparent that the invention attains the objective as set forth. Apparatus embodying the invention is sturdy in construction and well adapted for use in a multiplicity of environments.

Of those several embodiments of our invention that have been illustrated the invention is not limited thereto since many modifications may be made by one skilled in the art and it is intended by the claims to cover all such modifications as fall within the true spirit and scope of our invention.

What we claim as new and desire to secure by Letters Patent of the United States is:

1. A cam follower comprising
    a tubular member having a hollow cavity therein with an entrance opening on one side thereof,
    a base member having an opening in which said tubular member is positioned,
    a rounded end of said tubular member having a plurality of apertures therein,
    a gas supply source in said base member for supplying pressurized gas into said opening in said base member for supporting said tubular member in a vertical position and for supplying this same gas through said entrance opening and out said plurality of apertures to form a film between said tubular member and a cam associated therewith to provide proper lubrication between the two, and
    resilient means for maintaining said end of said tubular member adjacent a cam associated therewith.

2. A cam follower comprising
    a tubular member having a hollow cavity therein with an entrance opening on one side thereof,
    a base member having an opening in which said tubular member is positioned,
    a concave end of said tubular member being of the same curvature as the cam associated therewith and having a plurality of apertures therein, a gas supply source in said base member for supplying pressurized gas into said opening in said base member for supporting said tubular member in a vertical position and for supplying this same gas through said entrance opening and out said plurality of apertures to form a film between said tubular member and a cam associated therewith to provide proper lubrication between the two, and resilient means for maintaining said end of said tubular member adjacent a cam associated therewith.

3. A cam follower comprising
a tubular member having a hollow cavity therein with an entrance opening on one side thereof,
a base member having an opening in which said tubular member is positioned,
a rounded end of said tubular member having a plurality of apertures therein, said apertures being arranged at angles to one another,
a gas supply source in said base member for supplying pressurized gas into said opening in said base member for supporting said tubular member in a vertical position and for supplying this same gas through said entrance opening and out said plurality of apertures to form a film between said tubular member and a cam associated therewith to provide proper lubrication between the two, and
resilient means for maintaining said end of said tubular member adjacent the cam associated therewith.

4. A cam follower comprising
a tubular member having a hollow cavity therein with an entrance opening on one side thereof,
a base member having an opening in which said tubular member is positioned,
a rounded end of said tubular member of a porous material having a multiplicity of apertures therein,
a gas supply source in said base member for supplying pressurized gas into said opening in said base member for supporting said tubular member in a vertical position and for supplying this same gas through said opening and out said multiplicity of apertures to form a film between said tubular member and a cam associated therewith to provide proper lubrication between the two, and
a spring for maintaining said end of said tubular member adjacent a cam to permit retention of the fluid film between said tip and the cam.

5. A cam follower comprising
a tubular member having a hollow cavity therein with an entrance opening on one side thereof,
a base member having an opening in which said tubular member is positioned,
a rounded end of said tubular member having a plurality of apertures therein which communicate with larger pockets for distribution purposes,
a gas supply source in said base member for supplying pressurized gas into said opening in said base member for supporting said tubular member in a vertical position and for supplying this same gas through said opening into the interior cavity thereof and out said plurality of apertures to form a film between said tubular member and a cam associated therewith to provide proper lubrication between the two, and
a spring for maintaining said end of said tubular member adjacent the cam to permit retention of the fluid film between said tip and the cam.

References Cited

UNITED STATES PATENTS

| | | | |
|---|---|---|---|
| 1,871,270 | 8/1932 | Hubbard | 184—3 |
| 2,443,143 | 6/1948 | Madsen | 184—1 |
| 2,697,645 | 12/1954 | Mitchell | 184—1 X |
| 3,144,915 | 8/1964 | Burrell | 184—3 |

LAVERNE D. GEIGER, *Primary Examiner.*

H. BELL, *Assistant Examiner.*